Nov. 6, 1923.
W. F. BROWN
1,473,008
RAW MATERIAL CONVEYER FOR FEEDING GLASS FURNACES
Filed March 13, 1922
2 Sheets-Sheet 1
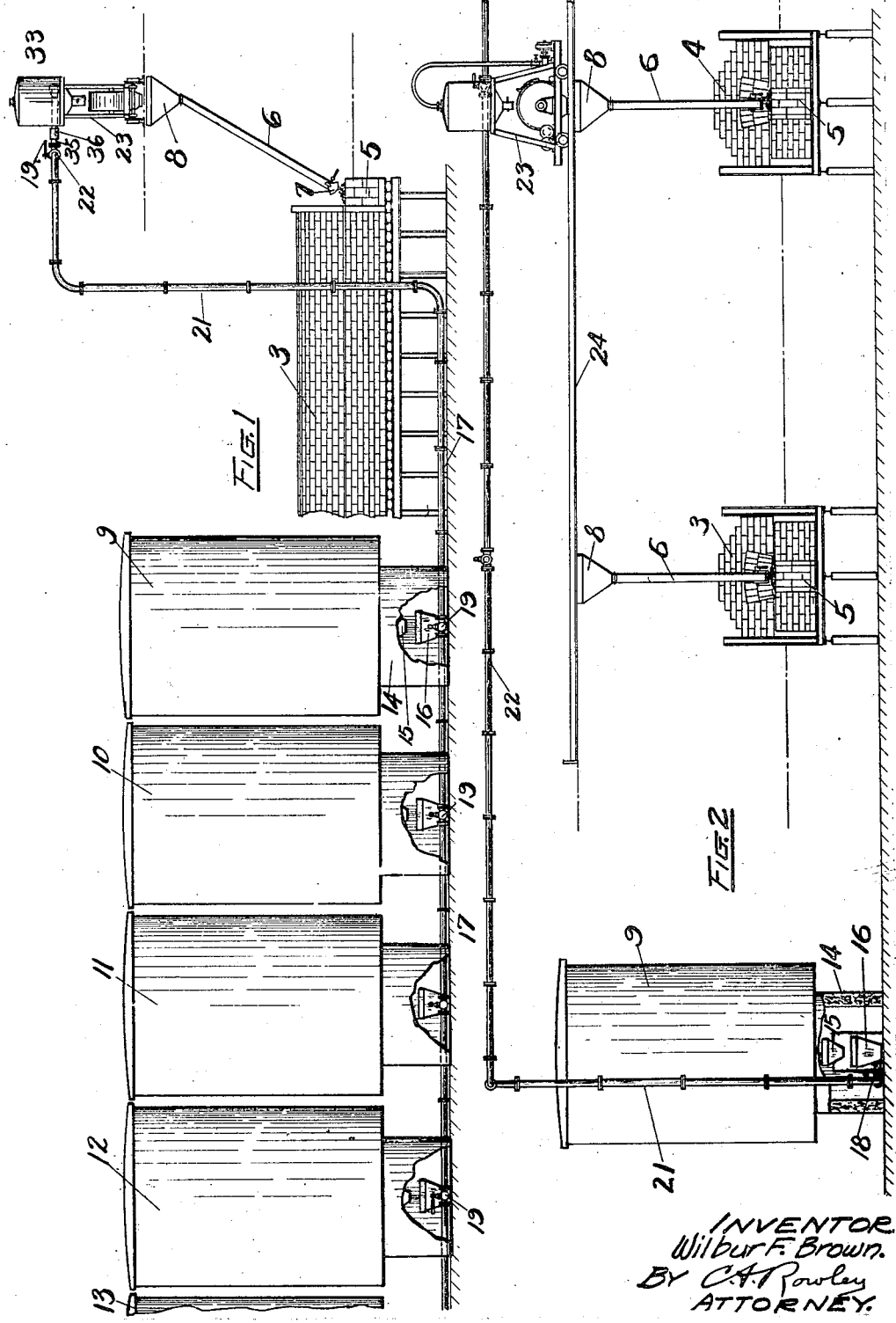

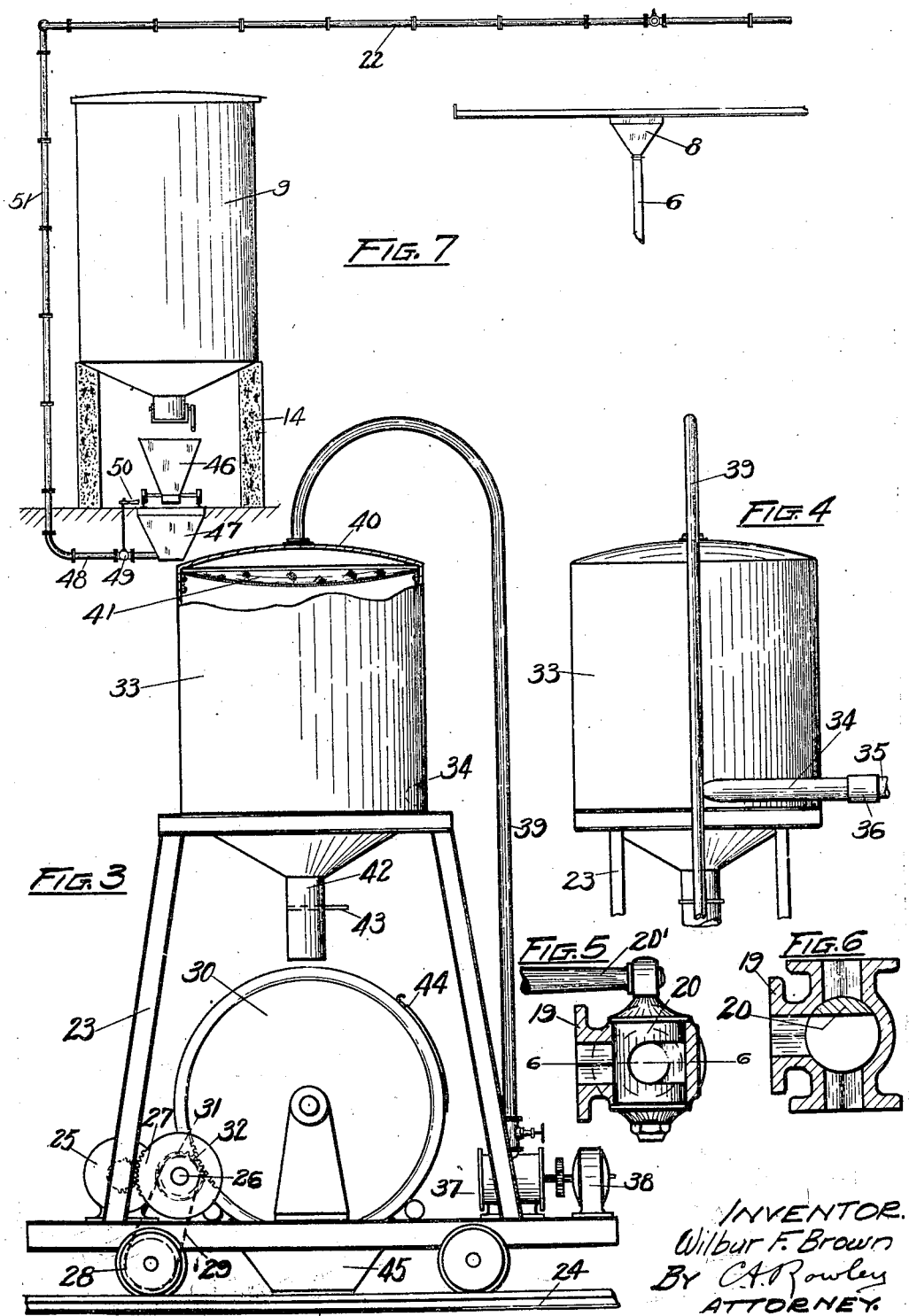

Patented Nov. 6, 1923.

1,473,008

UNITED STATES PATENT OFFICE.

WILBUR F. BROWN, OF CHARLESTON, WEST VIRGINIA, ASSIGNOR TO THE LIBBEY-OWENS SHEET GLASS COMPANY, OF TOLEDO, OHIO, A CORPORATION OF OHIO.

RAW-MATERIAL CONVEYER FOR FEEDING GLASS FURNACES.

Application filed March 13, 1922. Serial No. 543,192.

*To all whom it may concern:*

Be it known that I, WILBUR F. BROWN, a citizen of the United States, residing at Charleston, in the county of Kanawha and State of West Virginia, have invented new and useful Improvements in Raw-Material Conveyers for Feeding Glass Furnaces, of which the following is a specification.

This invention relates to a new and improved conveyer for feeding the raw materials to glass tank furnaces, and relates more particularly to an apparatus for pneumatically conveying the raw materials comprising the glass batch from the storage bins or tanks and delivering them to the glass melting furnaces.

The several raw materials comprised in the glass batch, such as sand, lime, salt-cake, cullet, etc., are usually kept in a series of separate tanks or storage bins. The required amount of each material must be weighed out, the several materials mixed together to form the batch, and the batch delivered to one of the furnaces. Each furnace must be fed with new batch at short intervals of time, and where the number of furnaces is large and the distance from the storage tanks to the furnaces necessarily a long one, the task of mixing and delivering the batch rapidly enough to supply the needs of the several furnaces is a difficult one. The ordinary methods of transporting the batch by trucks or bucket conveyers are too slow.

The object of the present invention is to provide a system for delivering these raw materials to the furnaces by suction. A single pipe line feeds all of the materials to all of the furnaces, and a single blowing and mixing unit is used interchangeably for any of the furnaces.

Other objects and details of the invention will become more apparent from the following detailed description of an apparatus embodying the principles of the invention.

In the accompanying drawings:

Fig. 1 is an elevation showing the series of raw-material tanks, a side elevation of part of one of the furnaces, and the pneumatic conveyer system.

Fig. 2 is an elevation taken at right angles to Fig. 1, showing two of the furnaces in front elevation.

Fig. 3 is a front elevation of the movable carriage on which are mounted the blower and mixer.

Fig. 4 is a partial elevation of the material-receiving chamber on the carriage taken at right-angles to Fig. 3.

Fig. 5 is a vertical section through one of the valves used in the pipe-line.

Fig. 6 is a horizontal section through the valve casing taken substantially on the line 6—6 of Fig. 5, the valve however being turned through 90° from the position illustrated in Fig. 5.

Fig. 7 is an elevation similar to Fig. 2 of a slightly modified form of the conveyer system.

Referring first to Figs. 1 and 2, a pair of glass melting furnaces are illustrated at 3 and 4. It is to be understood that while only two furnaces are here illustrated, these are merely the first two units of a series of furnaces similar to those shown. The batch is fed into the dog-house 5 at the front end of each furnace, from a feed pipe 6 having a cut-off closure 7 at its lower end. This pipe 6 feeds the batch by gravity from an overhead hopper 8.

At 9, 10, 11, 12 and 13 are illustrated a line of storage tanks or bins for the raw material. These tanks will usually be located outside of the structure which houses the several furnaces, and may be located at a considerable distance from the furnaces at the further end of the series. A single one of the materials which go to make up the batch is housed in each of the tanks. For example tank 9 may contain sand, tank 10 lime, tank 11 cullet, etc.

Each storage tank is mounted above a suitable supporting structure 14, which houses a weighing apparatus 15 of any approved type and a receiving hopper 16. Obviously one continuous housing 14 might be used beneath all of the tanks, instead of the series of separate housings illustrated. The requisite amount of raw material from the tank is let down into the weighing device 15, and is then dumped through into the hopper 16.

A single continuous conduit or line of pipe 17 extends through all of the housings 14 adjacent the hoppers 16, and each hopper 16 connects with the pipe 17 through branch pipes 18. At the juncture of the pipes 17 and 18 is located a valve, which may be of the type illustrated in Figs. 5 and 6, although this is merely an example of many valves that may be used. In the valve casing 19 is located a closure member 20 which may be rotated through 90° by means of hand-lever 20′.

When the member 20 is in the position shown in Fig. 5 the passage through the pipe 17 is clear and uninterrupted, and the branch pipe 18 is closed. When, however, the member 20 is turned to the position shown in Fig. 6, the branch 18 is in open communication with the pipe 17, and the portion of the pipe 17 beyond this branch 18 is closed. As shown in Fig. 1 of the drawings, the valves for each of the tanks 9, 10 and 11 are in the Fig. 5 position, with the branch 18 closed and the passage through the pipe 17 open. The valve for tank 12 has been turned so as to put the branch 18 and hopper 16 under this tank in communication with the conveyer pipe 17, and close off the pipe 17 beyond the tank 12.

The pipe 17 extends upwardly as at 21, and thence into the structure housing the furnaces and extends parallel to and above the line of batch hoppers 8, as at 22. Obviously, the exact path taken by the line of pipe 17 will vary according to the layout wherein this system is installed, and need not be exactly as here illustrated.

A carriage 23 is adapted to travel on rails 24 above the line of batch hoppers 8. This carriage may be conveniently driven from one location to another by motor 25, which actuates the drive-shaft 26 through gearing 27. One set of supporting wheels 28 for carriage 23 may be driven from shaft 26 through sprocket chain 29. A material-mixer 30, of the revolving drum type, is mounted on the carriage 23, and is also driven from shaft 26 through gears 31 and 32. By means of suitable clutch mechanism, not shown, either the carriage or the drum may be driven alternatively from motor 25.

Mounted on carriage 23 above the drum 30, is a receiving chamber 33 for the raw materials, which pass into this chamber through the pipe 34. Adjacent each hopper 8, the pipe line 22 has a short branch extension 35, controlled by a valve 19 of the type already described, and shown in Figs. 5 and 6. When the carriage 23 is located above any one of the hoppers 8, the pipe 35 may be connected to the adjacent pipe 34, by means of coupling member 36 of any approved type.

A blower 37, driven by motor 38, draws air through pipe 39 from the upper end 40 of chamber 33, thus creating a partial vacuum within the chamber. The air passes out of chamber 33 through suitable sieves or screens 41, which prevent the raw materials in the chamber from passing out into the blower. The materials collected within the chamber 33 may be delivered downwardly into the drum 30, through chute 42 controlled by closure 43. At this time the drum will be so positioned that the sliding door 44 will be below the chute. After the drum has been partially filled, the door 44 is closed and the drum is rotated by motor 25. After the materials are thoroughly mixed, the door 44 is again opened and the drum turned until the opening at door 44 is downward, and the contents of the drum are dumped out through chute 45 into hopper 8.

The operation of the apparatus is as follows: The attendant in charge of carriage 23 will run the carriage along the rails 24 till it is located above the hopper 8 that needs replenishing, for example the hopper 8 for feeding furnace 4, in Fig. 2. The member 36 will be adjusted to make connection between the receiving chamber and the conveyer pipe, and the adjacent valve 19 turned so that the active portion of the conveyer pipe will terminate within the receiving chamber through branch 34.

The attendant at the raw material tanks will weigh out the requisite amount of each material, using the weighing apparatus 15 beneath that particular tank, and emptying this weighed material into the hopper 16 therebeneath.

When the blower 37 on the carriage 23 is put in operation the suction created will draw air and the materials carried thereby through the pipe line, and when the valves 19 under the material tanks are successively opened, the materials in the hoppers 16 will be successively drawn through the pipe 17 into the chamber 33. These materials are then dumped into the mixer 30, as already described, and the glass batch formed by the mixing operation is afterwards delivered by gravity into the batch hopper 8. Any suitable signal system may be installed whereby the valves and motors at the two ends of the line will be manipulated at the proper times.

A slight modification of a portion of the apparatus is shown in Fig. 7. In this form, a receiving car 46 is movable beneath each of the series of material tanks, and the several materials are successively weighed out and delivered into this car. The car is then run to the position shown in Fig. 7 and the contents thereof dumped into the hopper 47. A delivery pipe 48, provided with valve 49, operable by lever 50, extends upwardly as at 51 and connects with the horizontal overhead pipe 22, as already described. The remainder of the apparatus, and the operation, is as already described.

The conveyer system might also be modified by using only a single station at which the carriage 23 receives the raw materials from the pipe line. This station might well be located midway along the line of furnaces. The carriage could then be transported along rails 24, while the mixing operation was being performed, and the mixed batch delivered into any selected one of the hoppers 8.

This apparatus provides a means for quickly and cleanly delivering the batch materials to the furnaces. The materials travel through the pipe at a high rate of speed, which cannot be attained with any other type of conveyer. Very little labor is required, one attendant at each end of the system being sufficient. Also, a very thoroughly mixed batch is obtained, since the mixing is done after the materials have been transported to the furnace. The mixed batch is delivered bodily, directly into the hopper which feeds the furnace, thus leaving no opportunity for segregation of the constituent materials.

Claims:

1. The method of feeding raw materials from a common source of supply to a plurality of glass melting furnaces, consisting in drawing the several materials by suction through a conduit to the vicinity of any selected furnace, there mixing the materials together, and then delivering the mixed batch directly to the furnace.

2. An apparatus for conveying raw materials from the storage tanks to a plurality of glass melting furnaces, comprising a conduit extending from the storage tanks to the furnaces, means for feeding the materials from the tanks to the conduit, means for drawing the materials through the conduit by suction to any selected furnace, and means for there delivering the materials from the conduit to the furnace.

3. An apparatus for conveying raw materials from the storage tanks to a plurality of glass melting furnaces, comprising a conduit extending from the storage tanks to the furnaces, means for feeding the materials from the tanks to the conduit, means for drawing the materials through the conduit by suction to any selected furnace, a mixer adjacent the furnace into which the materials are discharged, and means for feeding the mixed batch to the furnace.

4. An apparatus for conveying raw materials from the storage tanks to the glass melting furnaces, comprising a pipe extending from the storage tanks to the furnaces, means for feeding measured amounts of each material to the pipe, such means for drawing the materials through the pipe, and means for delivering the materials from the pipe to any selected furnace.

5. An apparatus for conveying raw materials from the storage tanks to a plurality of glass melting furnaces, comprising a pipe extending from the storage tanks to the furnaces, means for feeding measured amounts of each material to the pipe, suction means for drawing the materials through the pipe to any selected furnace, a mixer into which the materials are discharged, and means for feeding the mixed batch to the furnace.

6. An apparatus for conveying raw materials from the storage tanks to the glass melting furnaces, comprising a pipe extending from the storage tanks to the furnaces, means for feeding measured amounts of each material to the pipe, and means movable from one furnace to another for drawing the materials through the pipe by suction, and delivering them to the furnace.

7. An apparatus for conveying raw materials from the storage tanks to the glass melting furnaces, comprising a pipe extending from the storage tanks to the furnaces, means for feeding measured amounts of each material to the pipe, and means movable from one furnace to another for drawing the materials through the pipe by suction, mixing the materials to form the glass batch, and delivering the batch to the furnace.

8. The combination with a series of raw-material tanks and a series of glass furnaces, of a conveyer pipe extending adjacent all of the tanks and furnaces, means associated with each tank for delivering material from the tank to the pipe, a car movable parallel to the pipe from one furnace to another, a receiving chamber on the car and a pipe delivering into the chamber and which may be put in receiving communication with the conveyer pipe adjacent any of the furnaces, a blower on the car for drawing the raw materials by suction through the conveyer pipe into the chamber, a mixer on the car into which the materials are delivered from the chamber, and a glass batch receiving hopper for each furnace into which the batch is delivered from the mixer.

9. The combination with a series of raw material tanks and a series of glass furnaces, of a conveyer pipe extending adjacent all of the tanks and furnaces, a weighing device below each tank, a hopper in communication with the conveyer pipe for receiving the raw material from the weighing device, a valve between each hopper and the conveyer pipe, a glass batch hopper for each furnace and means for delivering the batch from the hopper to the furnace, a car movable above the line of batch hoppers and parallel to the conveyer pipe, a receiving chamber on the car, valved means for connecting the chamber in receiving communication with the conveyer pipe when the car is positioned over any batch hopper, a blower on the car for drawing materials by suction through the pipe into the chamber, and a material-mixer on the car below the chamber, the mixed materials or batch being delivered from the mixer into the batch hopper.

Signed at Charleston, in the county of Kanawha, and State of West Virginia, this 7th day of March, 1922.

WILBUR F. BROWN.